(No Model.)

S. HAINES.
MILL BUILDING.

No. 371,576. Patented Oct. 18, 1887.

WITNESSES.
Leonard H. Davis.
Grace E. Davis.

INVENTOR.
Samuel Haines
By Henry A. Davis
Attorney.

UNITED STATES PATENT OFFICE.

SAMUEL HAINES, OF GREENVILLE, NEW HAMPSHIRE.

MILL-BUILDING.

SPECIFICATION forming part of Letters Patent No. 371,576, dated October 18, 1887.

Application filed January 18, 1886. Serial No. 183,870. (No model.)

*To all whom it may concern:*

Be it known that I, SAMUEL HAINES, a citizen of the United States, residing at Greenville, in the county of Hillsborough and State of New Hampshire, have invented a new and useful Improvement in Mill-Building, of which the following is a specification.

The object of my invention is to strengthen the floors and walls of mills and other buildings in such a way as to prevent vibrations or laterally-reciprocating motion from being imparted to the buildings by motion of looms or other machinery, or any other cause. I attain this object by trussing or bracing the floor-timbers in the manner illustrated in the accompanying drawings, in which—

Figure 1:
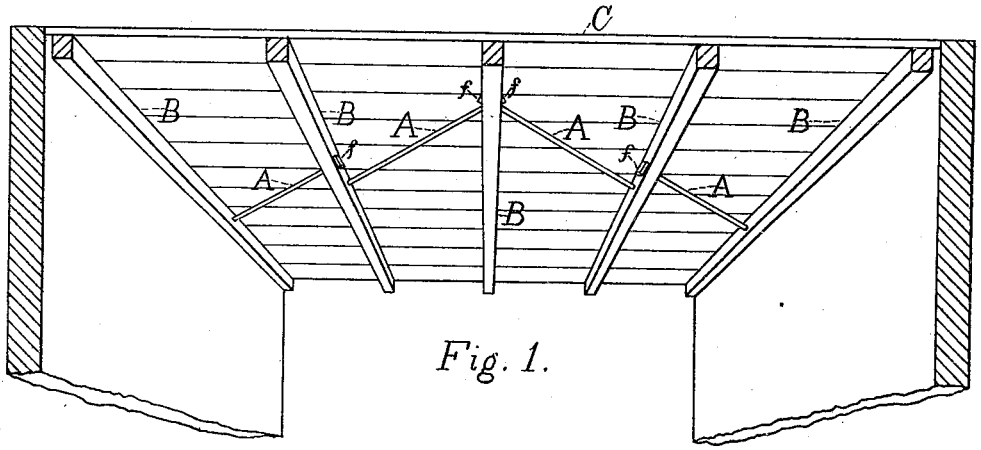
Figure 2:
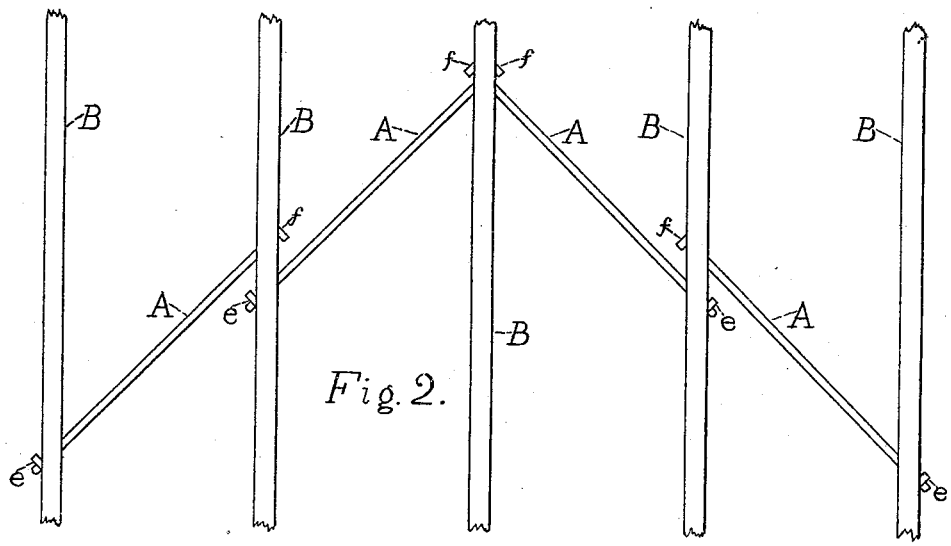

Figure 1 is a view in parallel perspective of the floor-timbers, rods, and under side of floor. Fig. 2 is a plan of the rods and floor-timbers with each end of timbers broken away.

Similar letters refer to similar parts in both views.

The rods A A are provided with the nut $e$ and head $f$; or $e$ and $f$ may both be nuts, one of which may be threaded left hand and the other right hand and fitted to corresponding threads on the rods. Holes are bored through the floor-timbers B B horizontally, preferably at an angle of forty-five degrees, with a line lengthwise the said timbers to receive the rods A A, and thereby connect each timber with the one next to it.

I prefer to use a single rod in each bay, commencing in the center timber and diverging to the right and left toward each end of the building. I do not, however, limit myself to the exact angle of forty-five degrees, and may use two or more rods in each bay running in different horizontal directions. I may also use braces in connection with or substituted for the rods A A. The floor C is spiked to the floor-timbers in the usual way.

In many cases the motion of the mill machinery is in harmony with the key-note or pitch of the floors and mill-walls and produces violent vibrations of the entire building. This has sometimes been obviated by changing the speed of the machinery. With the floors and walls strengthened by my improvement the vibrating pitch or key-note of the building may be changed by changing the tension of the rods, and dangerous vibrations entirely stopped, while the machinery may be run at its proper speed.

Having fully described my invention, what I desire to claim and secure by Letters Patent is—

1. The combination of the rods A A with the floor-timbers B B and floor C, substantially as described, for the purpose specified.

2. The method of changing the vibrating pitch of buildings, which consists in bracing the timbers thereof with one another by a system of braces, substantially as set forth.

SAMUEL HAINES.

Witnesses:
HENRY A. DAVIS,
GEORGE W. POORE.